US008914452B2

(12) United States Patent
Boston et al.

(10) Patent No.: US 8,914,452 B2
(45) Date of Patent: Dec. 16, 2014

(54) AUTOMATICALLY GENERATING A PERSONALIZED DIGEST OF MEETINGS

(75) Inventors: Jeffrey S. Boston, Wappingers Falls, NY (US); Jennifer C. Lai, Garrison, NY (US); Shimei Pan, Elmsford, NY (US); Mercan Topkara, Thornwood, NY (US); Stephen P. Wood, Thornwood, NY (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 13/485,415

(22) Filed: May 31, 2012

(65) Prior Publication Data

US 2013/0325972 A1   Dec. 5, 2013

(51) Int. Cl.
*G06F 15/16* (2006.01)

(52) U.S. Cl.
USPC ......................................................... 709/206

(58) Field of Classification Search
USPC ......................................................... 709/206
See application file for complete search history.

(56) References Cited

U.S. PATENT DOCUMENTS

| 6,535,639 | B1 | 3/2003 | Uchihachi et al. |
| 6,638,317 | B2 | 10/2003 | Nakao |
| 6,646,655 | B1 | 11/2003 | Brandt et al. |
| 6,690,725 | B1 | 2/2004 | Abdeljaoud et al. |
| 6,956,573 | B1 | 10/2005 | Bergen et al. |
| 7,143,352 | B2 | 11/2006 | Divakaran et al. |
| 7,149,974 | B2 | 12/2006 | Girgensohn et al. |
| 7,151,852 | B2 | 12/2006 | Gong et al. |
| 7,203,620 | B2 | 4/2007 | Li |
| 7,212,666 | B2 | 5/2007 | Zhang et al. |
| 7,246,314 | B2 | 7/2007 | Foote et al. |
| 7,298,930 | B1 | 11/2007 | Erol et al. |
| 7,363,294 | B2 | 4/2008 | Billsus et al. |
| 7,406,655 | B2 | 7/2008 | Jun |
| 7,466,858 | B2 | 12/2008 | Denoue et al. |
| 7,509,347 | B2 | 3/2009 | Chambers |
| 7,530,021 | B2 | 5/2009 | Cheng et al. |

(Continued)

FOREIGN PATENT DOCUMENTS

CN       1581163 A    2/2005
WO    2004040480 A1   5/2004

OTHER PUBLICATIONS

Tur et al., "The CALO Meeting Assistant System," IEEE Transactions on Audio, Speech, and Language Processing, 18(6):1601-1611, Aug. 2010.

(Continued)

*Primary Examiner* — Tu Nguyen
(74) *Attorney, Agent, or Firm* — Yee & Associates, P.C.; Anne Dougherty

(57) ABSTRACT

Automatically generating a meeting digest of a set of meetings is provided. A set of topics of interest to the parties to the set of meetings is detected utilizing a user model associated with a user that is based on at least one of communications, relationships, and roles of the parties to the set of meetings. Topic-related content associated with the set of topics of interest to the parties is extracted from meeting data corresponding to the set of meetings. Then, the meeting digest of the set of meetings is generated using the topic-related content associated with the set of topics of interest to the parties extracted from the meeting data corresponding to the set of meetings.

20 Claims, 8 Drawing Sheets

(56) References Cited

U.S. PATENT DOCUMENTS

| | | | |
|---|---|---|---|
| 7,593,618 | B2 | 9/2009 | Xu et al. |
| 7,613,365 | B2 | 11/2009 | Wang et al. |
| 7,679,518 | B1 | 3/2010 | Pabla et al. |
| 8,200,063 | B2 | 6/2012 | Chen et al. |
| 8,687,941 | B2 | 4/2014 | Dirik et al. |
| 2002/0069218 | A1 | 6/2002 | Sull et al. |
| 2002/0097277 | A1 | 7/2002 | Pitroda |
| 2003/0081937 | A1 | 5/2003 | Li et al. |
| 2003/0236792 | A1 | 12/2003 | Mangerie et al. |
| 2004/0059785 | A1 | 3/2004 | Blume |
| 2004/0139042 | A1 | 7/2004 | Schirmer et al. |
| 2005/0086598 | A1 | 4/2005 | Marshall, III et al. |
| 2005/0151735 | A1 | 7/2005 | Boekhorst |
| 2006/0047816 | A1 | 3/2006 | Lawton et al. |
| 2007/0046669 | A1 | 3/2007 | Choi et al. |
| 2007/0112926 | A1 | 5/2007 | Brett et al. |
| 2007/0168864 | A1 | 7/2007 | Uehara et al. |
| 2008/0027921 | A1 | 1/2008 | Chandrasekar et al. |
| 2008/0077869 | A1 | 3/2008 | Cho et al. |
| 2008/0082557 | A1 | 4/2008 | Ohara et al. |
| 2008/0109848 | A1 | 5/2008 | Li et al. |
| 2008/0172464 | A1 | 7/2008 | Thattai et al. |
| 2008/0320509 | A1 | 12/2008 | Gustafson et al. |
| 2009/0006608 | A1 | 1/2009 | Gupta et al. |
| 2009/0049129 | A1 | 2/2009 | Faisal et al. |
| 2009/0080853 | A1 | 3/2009 | Adcock et al. |
| 2009/0119246 | A1 | 5/2009 | Kansal |
| 2009/0125365 | A1 | 5/2009 | Masselle et al. |
| 2009/0177469 | A1 | 7/2009 | Findlay |
| 2009/0177774 | A1 | 7/2009 | Rehman et al. |
| 2009/0234721 | A1 | 9/2009 | Bigelow et al. |
| 2009/0271438 | A1 | 10/2009 | Agapi et al. |
| 2009/0287685 | A1 | 11/2009 | Charnock et al. |
| 2010/0039296 | A1 | 2/2010 | Marggraff et al. |
| 2010/0114627 | A1 | 5/2010 | Adler et al. |
| 2010/0153160 | A1 | 6/2010 | Bezemer et al. |
| 2010/0191741 | A1 | 7/2010 | Stefik et al. |
| 2010/0299763 | A1 | 11/2010 | Marcus et al. |
| 2010/0312726 | A1 | 12/2010 | Thompson et al. |
| 2011/0022967 | A1 | 1/2011 | Vijayakumar et al. |
| 2011/0078635 | A1 | 3/2011 | Fried |
| 2011/0131501 | A1 | 6/2011 | Lauridsen et al. |
| 2011/0137988 | A1 | 6/2011 | Balogh et al. |
| 2011/0264745 | A1 | 10/2011 | Ferlitsch |
| 2011/0267419 | A1 | 11/2011 | Quinn et al. |
| 2011/0282706 | A1 | 11/2011 | Ezra et al. |
| 2012/0106925 | A1 | 5/2012 | Dirik et al. |
| 2013/0132138 | A1 | 5/2013 | Doganata et al. |
| 2013/0219298 | A9* | 8/2013 | Whalin et al. .............. 715/753 |

OTHER PUBLICATIONS

"Workshop on Automatic Summarization for Different Genres, Media and Languages," The Association for Computational Linguist, http://aclweb.org/anthology-new/W/W11/W11-05, Jun. 23, 2011, 67 pages.

Xie et al., "Evaluating the Effectiveness of Features and Sampling in Extractive Meeting Summarization," IEEE Workshop on Spoken Language Technology (SLT), Goa, India, Dec. 2008, pp. 157-160.

Liu et al., "A Supervised Framework for Keyword Extraction From Meeting Transcripts," IEEE Transactions on Audio, Speech, and Language Processing, 19(3):538-548, Mar. 2011.

Final office action dated Jul. 2, 2013, regarding U.S. Appl. No. 12/915,584, 57 pages.

Notice of allowance dated Sep. 12, 2013, regarding U.S. Appl. No. 12/915,584, 9 pages.

Notice of allowance dated Nov. 18, 2013, regarding Appl. No. 12/915,584, 20 pages.

Office action dated Dec. 5, 2012, regarding U.S. Appl. No. 12/915,584, 43 pages.

Anand et al., "A Navigation Model for Exploring Scientific Workflow Provenance Graphs," Proceedings of the 4th Workshop on Workflows in Support of Large-Scale Science, Nov. 2009, 10 pages.

Anand et al., "Exploring Scientific Workflow Provenance Using Hybrid Queries Over Nested Data and Lineage Graphs," Proceedings of the 21st International Conference on SSDM, Jun. 2009, pp. 237-254.

Basak et al., "Video Summarization with Supervised Learning," 19th International Conference on Pattern Recognition, Dec. 2008, 4 pages.

Bellegarda, "Latent Semantic Mapping," Signal Processing Magazine, vol. 22, No. 5, Sep. 2005, pp. 70-80.

Blei, "Introduction to Probabilistic Topic Models," Communications of the ACM, Apr. 2012, vol. 55 No. 4, pp. 1-16.

Bouamrane et al., "Meeting Browsing," Multimedia Systems, Mar. 2007, vol. 12, No. 4-5, pp. 439-457.

Bouamrane et al., "Navigating Multimodal Meeting Recordings with the Meeting Miner," 7th International 16 Conference on Flexible Query Answer System (FQAS), Lecture Notes in Computer Science, Jun. 2006, vol. 4027, 12 pages.

Chen et al., "A Novel Video Summarization Based on Mining the Story-Structure and Semantic Relations Among Concept Entities," IEEE Transactions on Multimedia, Feb. 2009, vol. 11, No. 2, pp. 295-312.

Curbera et al., "Business Provenance—A Technology to Increase Traceability of End-to-End Operations," Proceedings of the OTM Confederated International Conference, Part 1, LNCS, Nov. 2008, pp. 100-119.

Florian et al., "A Statistical Model for Multilingual Entity Detection and Tracking," HLT, 2004, 9 pages.

Geyer et al., "Towards a Smarter Meeting Record—Capture and Access of Meetings Revisited," Multimedia Tools and Applications, Dec. 2005, vol. 27, No. 3., pp. 393-410.

Geyer et al., "Virtual Meeting Support in TeamSpace," Demo proposal accepted at the ACM Conference on Computer-Supported Cooperative Work (CSCW), Dec. 2000, 4 pages.

Gibson et al., "Application of Named Graphs Towards Custom Provenance Views," First Workshop on Theory and Practice of Provenance, Feb. 2009, 15 pages.

Gross et al., "Towards a Multimodal Meeting Record," Proceedings of IEEE International Conference on Multimedia and Expo (ICME), Jul. 2000, pp. 1593-1596.

Hanjalic et al., "An Integrated Scheme for Automated Video Abstraction Based on Unsupervised Cluster-Validity Analysis," IEEE Transactions on Circuits and Systems for Video Technology, vol. 9, No. 8, Dec. 1999, pp. 1280-1289.

Haubold et al., "Augmented Segmentation and Visualization for Presentation Videos," ACM Multimedia, Nov. 2005, 10 pages.

Hindus et al., "Ubiquitous Audio: Capturing Spontaneous Collaboration," Proceedings of the 1992 ACM Conference on Computer-Supported Cooperative Work (CSCW), Nov. 1992, pp. 210-217.

Hsueh et al., "Improving Meeting Summarization by Focusing on User Needs: A Task-Oriented Evaluation," Proceedings of the International Conference on Intelligent User Interfaces (IUI), Feb. 2009, 10 pages.

Jaimes et al., "Memory Cues for Meeting Video Retrieval," Proceedings of the 1st ACM Workshop on Continuous Archival and Retrieval of Personal Experiences (CARPE), Oct. 2004, pp. 74-85.

Li et al., "Browsing Digital Video," Proceedings of the SIGCHI Conference on Human Factors in Computing Systems, Apr. 2000, pp. 169-176.

Lin et al., "SmallBlue: People Mining for Expertise Search," IEEE MultiMedia, Jan. 2008, vol. 15, No. 1, pp. 78-84.

Lonsdale, "Using Provenance to Aid Document Re-Finding," Masters Thesis, Oregon State University, Jun. 2009, 67 pages.

Lux et al., "A Novel Tool for Quick Video Summarization using Keyframe Extraction Techniques," Proceedings of the 9th Workshop of the Multimedia Metadata Community, Mar. 2009, 15 pages.

Luz et al., "A Model for Meeting Content Storage and Retrieval," Proceedings of the 11th International Multimedia Modelling Conference, Jan. 2005, 7 pages.

Luz et al., "Meeting Browser: A System for Visual ising and Accessing Audio in Multicast Meetings," IEEE 3rd Workshop on Multimedia Signal Processing, Sep. 1999, pp. 587-592.

Ma et al., "A User Attention Model for Video Summarization," Proceedings of ACM Multimedia, Dec. 2002, 10 pages.

(56) References Cited

OTHER PUBLICATIONS

Ngo et al., "Video Summarization and Scene Detection by Graph Modeling," IEEE Transactions on Circuits and Systems for Video Technology, vol. 15, No. 2, Feb. 2005, pp. 296-305.

Olson et al., "Distance Matters," Human-Computer Interaction, Sep. 2000, vol. 15, No. 2., pp. 139-178.

Ram et al., "A New Perspective on Semantics of Data Provenance," Proceedings of the 1st International Workshop on the Role of Semantic Web in Provenance Management (SWPM), Oct. 2009, pp. 1-6.

Reynar, "Topic Segmentation: Algorithms and Applications," Dissertation in Computer and Information Science, University of Pennsylvania, 1998, 187 pages.

Rohlicek et al., "Continuous Hidden Markov Modeling for Speaker-Independent Word Spotting," International Conference on Acoustics, Speech, and Signal Processing (ICASSP), May 1989, vol. 1, pp. 627-630.

Russell, "A Design Pattern-based Video Summarization Technique: Moving from Low-level Signals to High-level Structure," Proceedings of the 33rd Annual Hawaii International Conference on System Sciences, Jan. 2000, pp. 1-5.

Sasongko et al., "Efficient Generation of Pleasant Video Summaries," 2nd ACM TRECVid Video Summarization Workshop, Oct. 2008, 6 pages.

Scheer et al., "ARIS Architecture and Reference Models for Business Process Management," Business Process Management, Models, Techniques, and Empirical Management, vol. 1806, Jan. 2000, pp. 366-379.

Simmhan et al., "A Framework for Collecting Provenance in Data-Centric Scientific Workflows," International Conference on Services Computing, Sep. 2006, 8 pages.

Stumpf et al., "The Use of Provenance in Information Retrieval," Workshop on Principles of Provenance (PROPR), Nov. 2007, 3 pages.

Taskiran, "Automated Video Program Summarization Using Speech Transcripts," IEEE Transactions on Multimedia, vol. 8, No. 4, Aug. 2006, pp. 775-791.

Topkara et al., "Tag Me While You Can: Making Online Recorded Meetings Shareable and Searchable," IBM Research Report, Aug. 2010, 11 pages.

Truong et al., "Video Abstraction: A Systematic Review and Classification," The ACM Transactions on Multimedia Computing, Communications, and Applications, vol. 2, No. 4, Nov. 2006, pp. 1-35.

Tseng et al., "Using MPEG-7 and MPEG-21 for Personalizing Video," IEEE Computer Society, vol. 11, No. 1, Jan.-Mar. 2004, pp. 42-52.

Tseng et al., "Video Summarization and Personalization for Pervasive Mobile Devices," IBM Research Report, Nov. 2001, 13 pages.

Waibel et al., "Advances in Automatic Meeting Record Creation and Access," Proceedings of the IEEE International Conference on Acoustics, Speech, and Signal Processing (ICASSP), vol. 1, May 2001, 4 pages.

Waibel et al., "Meeting Browser: Tracking and Summarizing Meetings," Proceedings of the Broadcast News Transcription and Understanding Workshop, Feb. 1998, pp. 281-286.

Wang et al., "Atomicity and Provenance Support for Pipe lined Scientific Workflows," Future Generation Computer Systems, vol. 25, No. 5, May 2009, pp. 568-576.

Wu et al., "Value of social network—A Large-scale analysis on network structure impact to financial revenue of information technology consultants," Winter Informations Systems Conference, Feb. 2009, 25 pages.

* cited by examiner

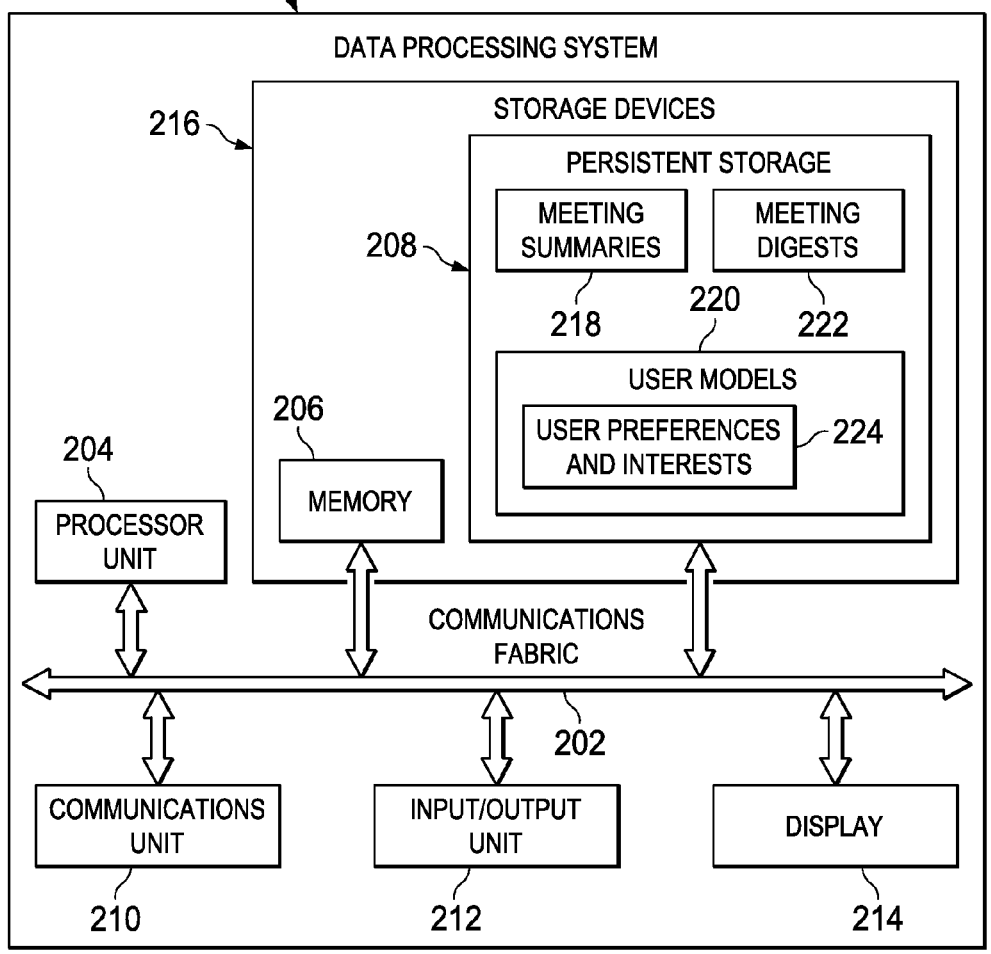
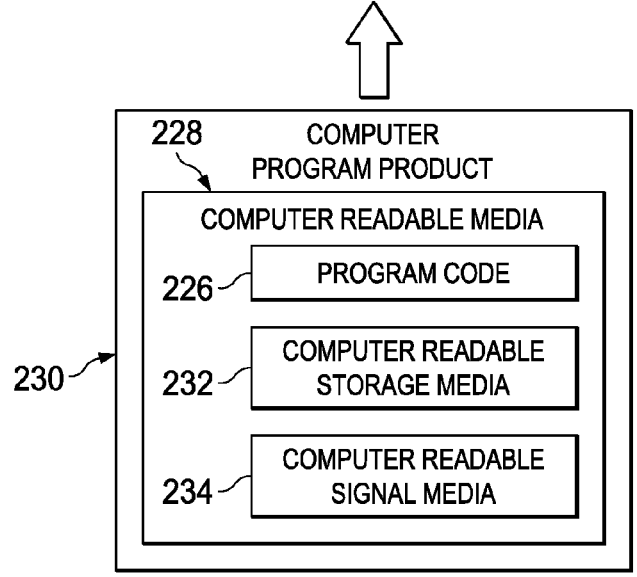
FIG. 2

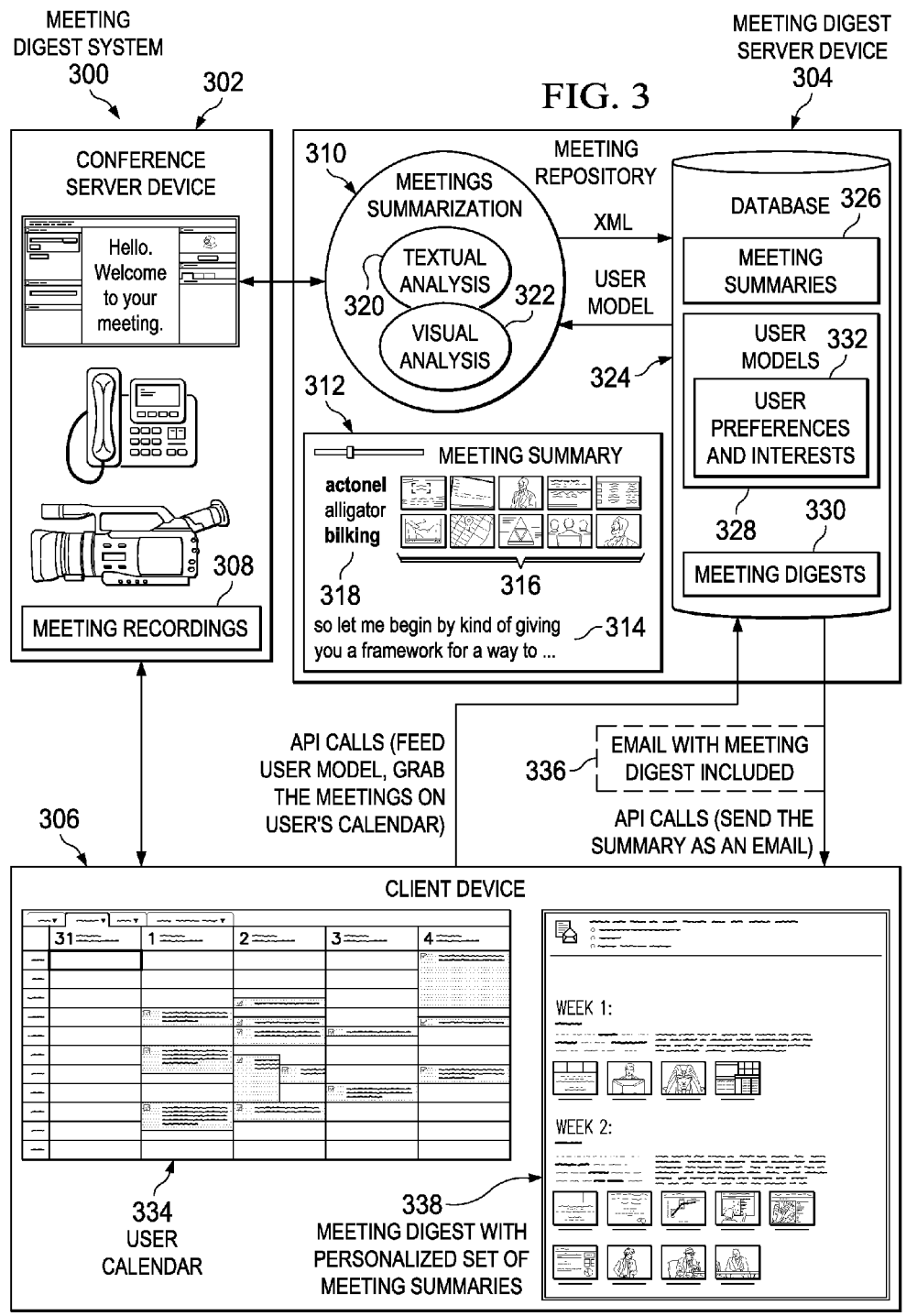

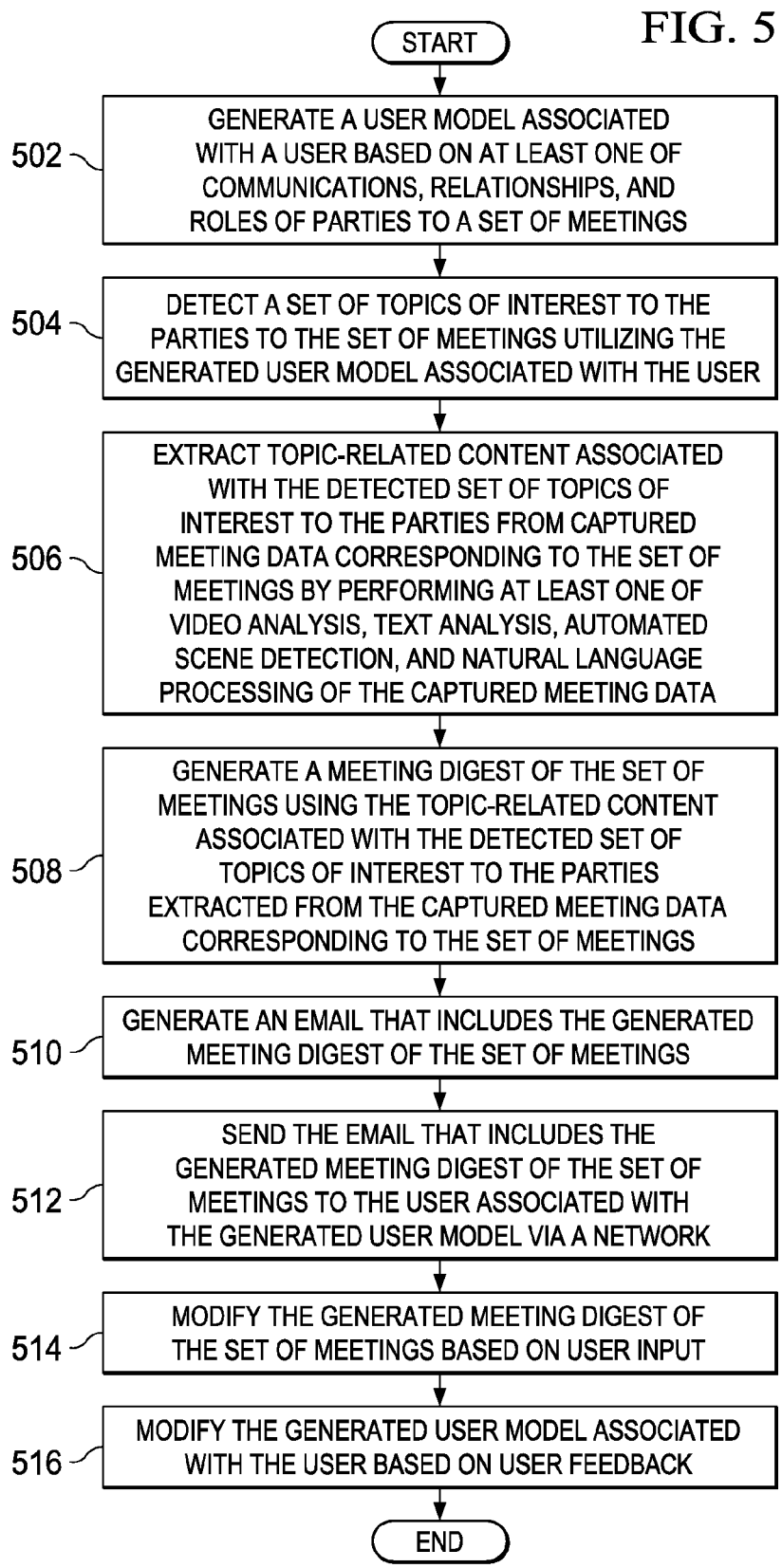

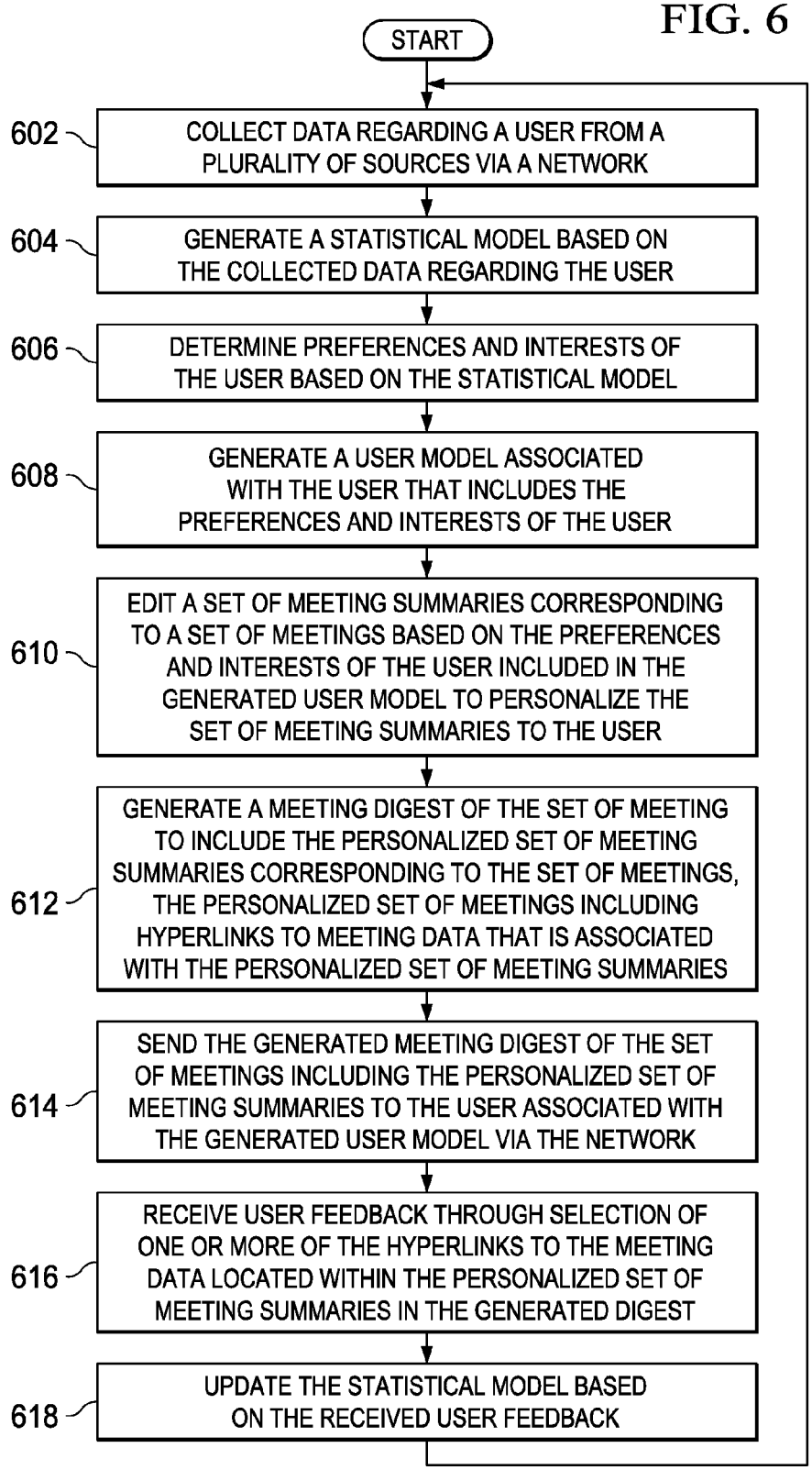

AUTOMATICALLY GENERATING A PERSONALIZED DIGEST OF MEETINGS

The present application is related to U.S. patent application Ser. No. 12/915,584 entitled "AUTOMATIC STATIC VIDEO SUMMARIZATION" filed on Oct. 29, 2010 and assigned to the assignee of the present application, the details of which are incorporated herein by reference.

BACKGROUND

1. Field

The disclosure relates generally to a computer implemented method, computer system, and computer program product for automatically generating a meeting digest of a set of one or more meetings that is personalized to a particular user based on a user model associated with that particular user.

2. Description of the Related Art

Meetings are an important venue within an enterprise for exchanging information. The capture of important points, decisions, and/or actions within the exchange of information during the meetings is often performed informally and manually. With the increase of geographically dispersed teams, enterprises are adopting technology to hold these meetings remotely via the World Wide Web. Commercial web-conferencing systems are being widely used by today's global enterprises to reduce the cost and time expenditures associated with travel. Many of these current web-conferencing systems facilitate automatic capture of information by recording remotely held meetings in their entirety and making the recording available for later viewing. These recordings are made available after the fact as a video and tend to last sixty minutes or more. These types of recordings can support people who did not attend the meeting, but hope to catch up on what information they may have missed. The recordings also are helpful to those individuals that attended the meeting, but do not recall specifics of the meeting or are looking for particular facts that were disseminated during the meeting (e.g. a product release date).

SUMMARY

According to one embodiment of the present invention, a computer implemented method for automatically generating a meeting digest of a set of meetings is provided. A computer detects a set of topics of interest to parties to the set of meetings utilizing a user model associated with a user that is based on at least one of communications, relationships, and roles of the parties to the set of meetings. The computer extracts topic-related content associated with the set of topics of interest to the parties from meeting data corresponding to the set of meetings. Then, the computer generates the meeting digest of the set of meetings using the topic-related content associated with the set of topics of interest to the parties extracted from the meeting data corresponding to the set of meetings. In other embodiments of the present invention, a computer system and a computer program product for automatically generating a meeting digest of a set of meetings are provided.

BRIEF DESCRIPTION OF THE SEVERAL VIEWS OF THE DRAWINGS

FIG. 2 is a diagram of a data processing system in which illustrative embodiments may be implemented;

FIG. 3 is a diagram illustrating an example of a meeting digest system in accordance with an illustrative embodiment;

FIG. 5 is a flowchart illustrating a process for generating and sending a digest email in accordance with an illustrative embodiment;

FIG. 6 is a flowchart illustrating a process for generating a user model in accordance with an illustrative embodiment.

DETAILED DESCRIPTION

Figure 1:
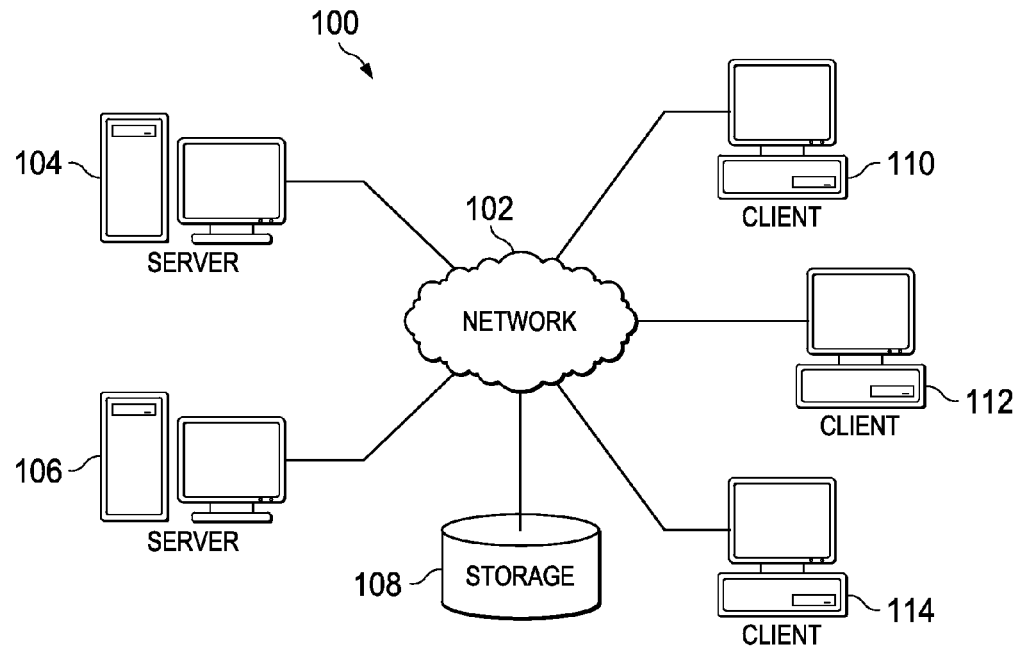
FIG. 1 is a pictorial representation of a network of data processing systems in which illustrative embodiments may be implemented.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server 104 and server 106 connect to network 102, along with storage unit 108. Server 104 may be, for example, a conferencing server device with high speed connections to network 102. Server 104 may reside, for example, within a web-conferencing system that provides web-conferencing services to a plurality of client devices. Also, server 104 may represent a plurality of web-conferencing servers. Server 106 may be, for example, a meeting digest server device that provides digests of meeting summaries. The meeting summaries may be, for example, summaries of meetings that were conducted via a web-conferencing system utilizing server 104. Thus in this example, a meeting refers to parties, such as individuals or persons, utilizing computing devices connected via network 102, which come together online to discuss topics of interest. However, it should be noted that a meeting also may be conducted locally in a physical location or may be conducted both remotely online and locally. Further, server 106 may also represent a plurality of server devices.

Storage unit 108 is a network storage device capable of storing data in a structured or unstructured format. Storage unit 108 may be, for example, a network storage device that provides storage for meeting summaries, user models associated with a plurality of users, and digests of a set of one or more meeting summaries that are personalized to specific users based on the user models. The user models include preferences and interests of each respective user. Further, it should be noted that storage unit 108 may store other data, such as, for example, user information that may include user identification and passwords used to access the web-conferencing system.

Clients 110, 112, and 114 also connect to network 102. Clients 110, 112, and 114 are clients to server 104 and server 106. In the depicted example, server 104 and server 106 may provide information, such as boot files, operating system images, and applications to clients 110, 112, and 114. In this example, clients 110, 112, and 114 are data processing systems, such as, for example, personal computers, network computers, laptop computers, handheld computers, personal digital assistants, smart phones, cellular phones, or any combination thereof. Users may utilize clients 110, 112, and 114 to receive and view meeting digest information provided by, for example, server 106. Server 106 may send the meeting digest information to one or more of clients 110, 112, and 114 in, for example, an email or as a calendar entry. Also, server 106 may make the meeting digest accessible via a Webpage. Furthermore, it should be noted that network data processing system 100 may include additional server devices, client devices, and other devices not shown.

Program code located in network data processing system 100 may be stored on a computer recordable storage medium and downloaded to a computer or other device for use. For example, program code may be stored on a computer recordable storage medium on server 106 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 106 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, computer readable program code in functional form, and/or other suitable information either on a transient basis and/or a persistent basis. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores meeting summaries 218, user models 220, and meeting digests 222. Meeting summaries 218 represent a set of one or more meeting summaries that are generated by a meeting digest server, such as server 106 in FIG. 1, from meeting data that are captured by a conferencing server, such as server 104 in FIG. 1. The captured meeting data may include, for example, textual data, such as speech to text transcriptions, documents, and annotations; visual data, such as video clips, slide data, picture data, and graphical data; and audio data.

The meeting digest server may generate meeting summaries 218 by using, for example, a text-based analysis and/or a video-based analysis of the captured meeting data. The text-based analysis and video-based analysis of the captured meeting data are used to extract selected text and video segments to generate a summary of a meeting. The text-based analysis may include, for example, natural language processing and the video-based analysis may include, for example, automated scene detection.

User models 220 represent a set of one or more user models. Each user model in user models 220 is associated with a particular user and includes user preferences and interests 224 associated with each particular user. The meeting digest server generates the user model from data collected from a plurality of sources regarding a particular user. The data sources may be, for example, a user's electronic calendar on a personal computer, the user's browser history of websites visited, the user's electronic address book that may provide relationship information with other users, the user's email communications, the user's instant messaging communications, the user's chat room discussions, the user's IP telephony discussions, documents created or viewed by the user on the personal computer, video clips viewed by the user, a meeting program that may provide information regarding the user's participation and/or the user's role in the meeting, such as a moderator, organizer, or presenter, or any other sources of information regarding the user that may be used to determine user preferences and interests 224.

Meeting digests 222 represent a set of one or more meeting digests. A meeting digest includes a set of one or more meeting summaries that is personalized to a particular user. A meeting digest may include keywords, selected video frames, snippets from email communications, snippets from instant messaging communications, snippets from chat room discussions, extracted audio content, speech to text phrases, extracted "to do" items from an electronic "to do" list, extracted project dates from an electronic calendar, or any other information that may be of interest to a particular user. The meeting digest server personalizes the set of one or more meeting summaries in the meeting digest to a particular user by utilizing the user model associated with that particular user that includes the user's preferences and interests. Further, the meeting digest server may insert hyperlinks within the one or more personalized meeting summaries. A hyperlink is an active link that references or automatically directs the user to data associated with the personalized meeting summaries when activated by an input, such as a mouse click over the hyperlink.

Communications unit 210, in this example, provides for communication with other data processing systems or devices. In this example, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by processor unit 204. The program code, in the different embodiments, may be embodied on different physical or computer readable storage media, such as memory 206 or persistent storage 208.

Program code 226 is located in a functional form on computer readable media 228 that is selectively removable and may be loaded onto or transferred to data processing system 200 for running by processor unit 204. Program code 226 and computer readable media 228 form computer program product 230. In one example, computer readable media 228 may be computer readable storage media 232 or computer readable signal media 234. Computer readable storage media 232 may include, for example, an optical or magnetic disc that is inserted or placed into a drive or other device that is part of persistent storage 208 for transfer onto a storage device, such as a hard drive, that is part of persistent storage 208. Computer readable storage media 232 also may take the form of a persistent storage, such as a hard drive, a thumb drive, or a flash memory that is connected to data processing system 200. In some instances, computer readable storage media 232 may not be removable from data processing system 200.

Alternatively, program code 226 may be transferred to data processing system 200 using computer readable signal media 234. Computer readable signal media 234 may be, for example, a propagated data signal containing program code 226. For example, computer readable signal media 234 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 226 may be downloaded over a network to persistent storage 208 from another device or data processing system through computer readable signal media 234 for use within data processing system 200. For instance, program code stored in a computer readable storage media in a server data processing system may be downloaded over a network from the server to data processing system 200. The data processing system providing program code 226 may be a server computer, a client computer, or some other device capable of storing and transmitting program code 226.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 228 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

During the course of developing illustrative embodiments it was discovered that web-conferencing creates the possibility of using recordings of meetings as archives of information that was disseminated in the meetings. As the number of repositories of such recorded meetings grows, the value and utility of these data stores will depend on providing tools that will help a user quickly browse, find, and retrieve data of interest to that user. Given the high time cost involved with viewing a recorded meeting in its entirety, a need exists for tools that assist efficient data discovery and access. Currently, it is too time consuming and inefficient to sift through a large number of recorded meetings to find specific information or to refresh one's memory on what exactly was discussed in past meetings.

To facilitate access to recorded meetings and encourage improved information sharing among users, illustrative embodiments provide a meeting analytics system that automatically generates personalized meeting digests. Illustrative embodiments generate these meeting digests from content of existing meeting artifacts, such as meeting video recordings, presentation slides, and human annotations of the content (e.g., tags). Illustrative embodiments then directly share these meeting digests with meeting attendees through, for example, emails or calendar updates.

Illustrative embodiments may automatically generate these topic-based meeting digests on, for example, a daily, weekly, or monthly basis. Alternatively, illustrative embodiments may generate a meeting digest after each meeting or on demand. If a meeting digest includes multiple meeting summaries, the meeting digest may be organized by, for example, meeting dates, main topics of the meetings, or by other meeting metadata, such as meetings belonging to a same series of meetings. A summary of each meeting in the digest may include, for example, a visual summary of the meeting's videos (e.g., thumbnails of the top N-number of key frames), a keyword summary of the textual content automatically derived from meeting transcripts and presentation slides, and extracted key meeting artifacts, such as decision points, "to do" items, dates, names, and uniform resource locators (URLs). Illustrative embodiments also automatically hyperlink extracted meeting artifacts to corresponding video segments stored in the meeting repository such that with a simple mouse click, the corresponding video segments can be played back directly via a video player.

Moreover, if there is more than one meeting summary in a digest, illustrative embodiments automatically generate a topic-based interactive visual summary of all the meetings, which may include topic content changes within the meetings over time. In other words, illustrative embodiments automatically generate a single summary for each meeting and a combined digest of several meeting summaries, which may possibly include a variety of different topics with different people presenting material on the different topics. Also, illustrative embodiments may visualize "to do" items, which are related to recurring meetings associated with a project, on a timeline to track the progress of that project. Within the same framework, illustrative embodiments may also create activities, which may be generically thought of as email-based reminders of tasks assigned to a person and tracked centrally, based on human-provided annotations, such as those items specifically tagged as task items. Furthermore, illustrative embodiments may generate meeting digest feeds to news aggregators for dissemination. Illustrative embodiments may generate the meeting digest feeds in, for example, an extensible markup language (XML) format for consumption by any XML data feed consumer.

Most importantly, illustrative embodiments customize or personalize the content of the meeting digest based on a user's interests and preferences. For example, users may explicitly specify what topics they are interested in and how much detail is to be included within a meeting digest. In addition, illustrative embodiments may automatically mine a user's interests and preferences based on past meetings the user has attended and past meeting artifacts the user has accessed. Illustrative embodiments may also mine user interests and preferences from external data sources, such as, for example, emails, chat messages, and social activities. Illustrative embodiments generate a user model associated with the user from the data extracted from the various data sources which captures the user's general interests and preferences.

In addition, illustrative embodiments may customize the content of a meeting digest based on the results of a search query. For example, illustrative embodiments may rank all meetings according to each meeting's relevance to the search query and then generate a meeting digest that summarizes a pre-determined number of top ranking meetings retrieved. Illustrative embodiments adjust or edit the length of a meeting summary and the details included in the meeting summary based on a user's preferences and interests found in a user model associated with the user.

Thus, illustrative embodiments of the present invention provide a computer implemented method, computer system, and computer program product for automatically generating a meeting digest of a set of meetings. A set of meetings is one or more different meetings. A computer detects a set of one or more topics of interest to parties to the set of meetings utilizing a user model associated with a user that is based on at least one of communications, relationships, and roles of the parties to the set of meetings. The computer extracts topic-related content associated with the set of topics of interest to the parties from meeting data corresponding to the set of meetings. Then, the computer generates the meeting digest of the set of meetings using the topic-related content associated with the set of topics of interest to the parties extracted from the meeting data corresponding to the set of meetings. Afterward, the computer generates an email that includes the meeting digest of the set of meetings and sends the email via a network to the user associated with the user model.

With reference now to FIG. 3, a diagram illustrating an example of a meeting digest system is depicted in accordance with an illustrative embodiment. Meeting digest system 300 may be implemented in network data processing system 100 in FIG. 1, for example. Illustrative embodiments utilize meeting digest system 300 to generate meeting digests of a set of one or more meetings that are personalized to a particular user based on a user model associated with the user.

Meeting digest system 300 includes conferencing server device 302, meeting digest server device 304, and client device 306. Conferencing server device 302 may be, for example, server 104 in FIG. 1. Conferencing server device 302 provides conferencing services to a plurality of client devices. Conferencing server device 302 may combine, for example, telephonic-based communications and/or computer-based communications using either or both wireless and wired connections. Conferencing server device 302 captures the contents of an entire meeting as a record of that meeting and then stores the recording of the meeting in meeting records 308. Meeting records 308 is a set of one or more meeting recordings. It should be noted that conferencing server device 302 may record a plurality of different meeting at a same time.

Conferencing server device 302 may send meeting recordings 308 to meeting digest server device 304 on a pre-determined time interval basis, such as daily, weekly, or monthly. Alternatively, conferencing server device 302 may send a recording of a meeting to meeting digest server device 304 at the completion of each meeting or on demand by meeting digest server device 304. Upon receiving meeting recordings 308, meeting digest server device 304 generates meetings summarization 310.

Meetings summarization 310 includes a summarization of each meeting within meeting recordings 308. Meeting summary 312 is an example of one such summarization of a meeting. Meeting summary 312 may include, for example, a summary of text, such as textual summary 314, a static summary of video clips or slides, such as visual summary 316, and a summary of keywords, such as keyword summary 318. However, it should be noted that meeting summary 312 may include any relevant summary information. In addition, meeting summary 312 may include more or less information than illustrated in this example.

Meeting digest server device 304 generates meetings summary 312 using textual analysis 320 and visual analysis 322 of a recording of a meeting, such as meeting recordings 308. Textual analysis 320 may use natural language processing (NLP), for example. Natural language processing (NLP) is a field of computer science, machine learning, and linguistics concerned with interactions between computers and human (natural) languages. Specifically, natural language processing is the process of a computer extracting meaningful information from natural language input. Natural language processing algorithms are grounded in machine learning, especially statistical machine learning. Some examples of tasks performed by natural language processing are: 1) automatic summarization, which produces a readable summary of a chunk of text; 2) named entity recognition, which determines which items within a chunk of text are proper names, such as people, places, and enterprises; 3) relationship extraction, which identifies relationships among named entities within a chunk of text; 4) topic segmentation and recognition, which separates chunks of text into segments, each of which is devoted to a topic, and identifies the topic of the segment.

Visual analysis 322 may use automated scene detection, for example. The automated scene detection detects frames within a video clip having a correlation or similarity with one another. Then, visual analysis 322 clusters the detected frames into different clusters based on their correlation with one another. In addition, visual analysis 322 ranks the clusters of frames based on, for example, relevance to a topic of the meeting. At least a portion of the frames are selected based on cluster ranking for inclusion in a static summary of the video clip, such as visual summary 316. The static summary is generated by combining thumbnail images of the selected frames.

Meeting digest server device 304 includes database 324, which is a repository for meeting data and user data. Database 324 may be, for example, persistent storage 208 in FIG. 2. It should be noted that even though database 324 is illustrated as being located within meeting digest server device 304, in an alternative illustrative embodiment database 324 may be located remotely as a separate storage device, such as storage 108 in FIG. 1.

Database 324 stores each meeting summary in meeting summaries 326. Further, database 324 may store meeting summaries 326 in an extensible markup language format, for example. Meeting summaries 326 may be, for example, meeting summaries 218 in FIG. 2. Database 324 also stores user models 328 and meeting digests 330. User models 328 and meeting digests 330 may be, for example, user models 220 and meeting digests 222 in FIG. 2.

User models 328 represent a set of one or more user models. Each user model in user models 328 is associated with a particular user. In addition, each user model in user models 328 includes user preferences and interests 332. User preferences and interests 332 are associated with each particular user that corresponds to a particular user model in user models 328. Meeting digest server device 304 may generate a particular user model by collecting data regarding that particular user from a plurality of data sources. A data source may be, for example, a user's electronic calendar on a personal computer, such as user calendar 334 on client device 306. Other data sources may be, for example, the user's browser history, the user's electronic address book and/or contact list, the user's electronic communications, the user's IP telephony discussions, data stored on the user's computer, or any other source of information regarding the user that may be used to determine user preferences and interests 332.

Meeting digests 330 represent a set of one or more meeting digests. Each meeting digest in meeting digests 330 includes a set of one or more meeting summaries that are personalized to a particular user based on user preferences and interests 332 within a particular user model of user models 328 that corresponds to that particular user.

Meeting digest server device 304 sends email with meeting digest included 336 to client device 306. Upon accessing email with meeting digest included 336, a user of client device 306 views meeting digest with a personalized set of meeting summaries 338. Meeting digest with a personalized set of meeting summaries 338 is a customized set of one or more meeting summaries included in a meeting digest that are personalized to that particular user.

The contents of meeting digest with a personalized set of meeting summaries 338 may include, for example, a static visual summary of a meeting's video clips; a keyword summary of textual content of the meeting; extracted key meeting artifacts, such as decision points, "to do" items, dates, names, and URLs; a topic flow visualization of the meeting's content; and a visualization of "to do" items on a timeline. Furthermore, all meeting artifacts included within meeting digest with a personalized set of meeting summaries 338 may be hyperlinked to corresponding visual data segments or textual data segments of the meeting.

Also, the amount of detail and the amount of information that is highlighted within meeting digest with a personalized set of meeting summaries 338 depends on the level of relevance of that information to the user model associated with that particular user, which may take into account the user's relations within the user's social network. Meeting digest server device 304 may use, for example, a list of participants of a meeting that a user attended, a hierarchical structure of employees in an enterprise that the user works for, an electronic address book or buddy list of the user, and/or social media contacts of the user to determine relations within the user's social network.

An example of how meeting digest server device 304 may use the social and organizational relations in personalizing a meeting summary may be as follows: John and Mary have an IP telephony discussion about proteins. Mary is the head of the organization, so John determines that the topic of proteins must be particularly important to the organization. Later, John participates in a meeting where Bob, the head of marketing, and Mary are presenting, along with Jerry, a moderator who introduces Bob and Mary. Mary's portion of the discussion includes one section about DNA and another about proteins. Bob then discusses information about proteins. Subsequently, John receives a personalized meeting digest of the meeting that includes a lot of detail regarding Mary's discussion of proteins, less detail regarding Bob's discussion of proteins, while Jerry's portion of the meeting is completely removed. Thus, the prior IP telephony communication about a particular topic (i.e., proteins) or an organizational relationship between parties (i.e., Mary is the head of the organization that John is a part of and Bob is the head of marketing) is used to vary the level of detail and the highlighted information within the personalized meeting digest.

Thus, meeting digest server device 304 performs automated visual and textual analysis on captured meeting content to generate visual and textual summaries of meetings. Meeting digest server device 304 may perform automated scene detection, frame clustering, and cluster ranking to generate a static visual summary of video clips of a meeting. Meeting digest server device 304 may also utilize natural language processing techniques, such as topic modeling or named-entity detection, to group meetings by topics and to identify important names of people, organizations, or projects found within meeting transcripts or slides. Furthermore, meeting digest server device 304 may use rule-based approaches to detect important dates, action items, and decision points.

As a result, meeting digest server device 304 focuses on summarizing meetings that a user may have attended and provides the most relevant information from these meetings to the user. Meeting digest server device 304 leverages social network relations to provide a better summarization of possibly multiple meetings in one meeting digest document, which is hyperlinked to video playbacks and meeting-related documents. Meetings are complex events that involve participation of several people, as well as attachment of several documents, which have time and location information associated with these documents. A series of meetings may exist where some of the meetings are follow-up meetings, or predecessor meetings of other meetings, or meetings may turn into regularly scheduled meetings. Meeting digest server device 304 may use all of this information to model users' interests, activities, and social networks.

Figure 4C:
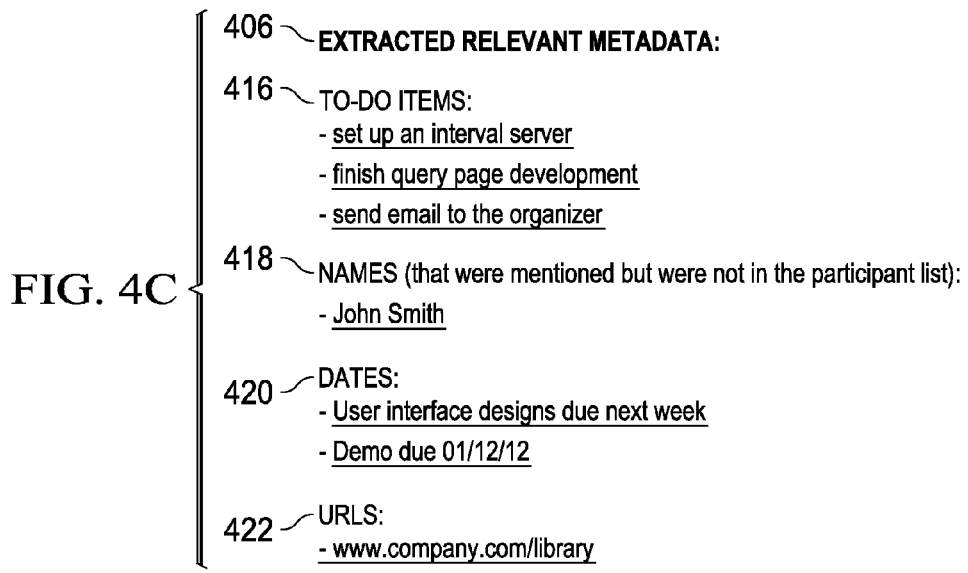
FIGS. 4A-4C are a specific example of a digest email in accordance with an illustrative embodiment.
Figure 4A:
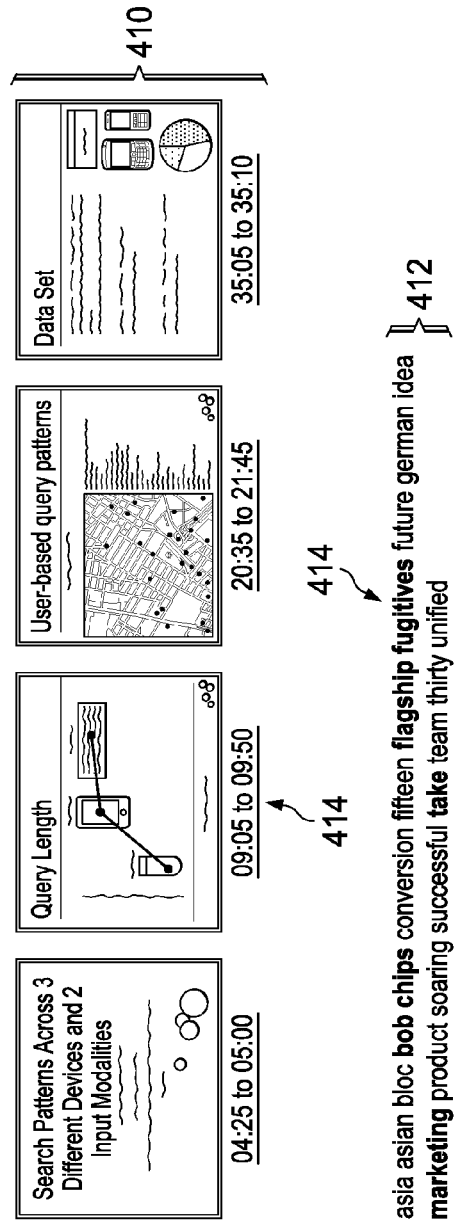
Figure 4B:
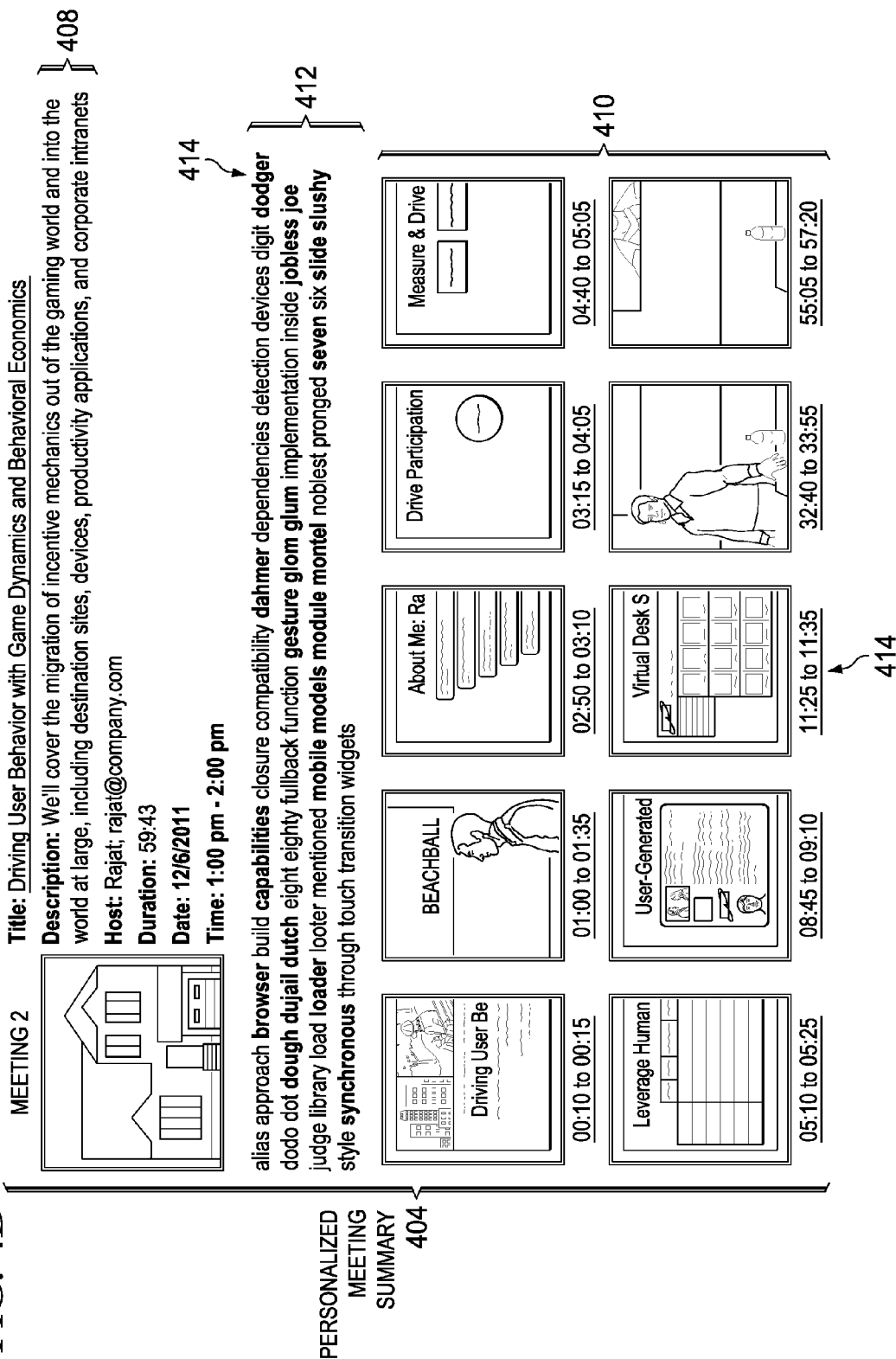

With reference now to FIGS. 4A-4C, a specific example of a digest email is depicted in accordance with an illustrative embodiment. Digest email 400 is an email that includes a meeting digest, such as email with meeting digest included 336 in FIG. 3. The meeting digest includes a personalized set of one or more meeting summaries, such as meeting digest with a personalized set of meeting summaries 338 in FIG. 3.

For example, digest email 400 includes personalized meeting summary 402, personalized meeting summary 404, and extracted relevant metadata 406. Personalized meeting summary 402 and personalized meeting summary 404 are summaries of two different meetings, which were attended by a particular user, that are customized to that particular user utilizing the user's preferences and interests included in a user model associated with that particular user. Both personalized meeting summary 402 and personalized meeting summary 404 include textual summary 408, visual summary 410, and keyword summary 412, such as textual summary 314, visual summary 316, and keyword summary 318 in FIG. 3. Also, personalized meeting summary 402 and personalized meeting summary 404 include highlighted hyperlinks 414, which are active links to corresponding textual and visual data within meeting recordings, such as meeting recordings 308 in FIG. 3.

Extracted relevant metadata 406 include "to-do" items 416, names 418, dates 420, and uniform resource locators 422. "To-do" items 416 includes items that need to be performed, such as, for example, set up an internal server, finish query page development, and send an email to the organizer. Names 418 may include, for example, names of people mentioned in a meeting discussion, such as John Smith, but were not included in a list of participants of the meeting. Dates 420 include dates of tasks that need to be performed, such as, for example, user interface designs are due next week and a demonstration of the user interface is due on Jan. 12, 2012. Uniform resource locators 422 may include, for example, the uniform resource locator of a company's library of documents, such as www.company.com/library. It should be noted that digest email 400 is only intended as an example and not intended as a limitation on illustrative embodiments. In other words, illustrative embodiments may include less information that what is shown in the example of digest email 400 or may include other information not shown.

With reference now to FIG. 5, a flowchart illustrating a process for generating and sending a digest email is shown in accordance with an illustrative embodiment. The process shown in FIG. 5 may be implemented in a data processing system, such as, for example, data processing system 200 in FIG. 2.

The process begins when the data processing system generates a user model associated with a user based on at least one of communications, relationships, and roles of parties to a set of meetings (step 502). The user model may be, for example, a user model within user models 328 in FIG. 3. Then, the data processing system detects a set of topics of interest to the parties using the generated user model associated with the user (step 504). The data processing system may detect the set of topics of interest to the parties by utilizing user preferences and interests located within each user model, such as user preferences and interests 332 in FIG. 3. Afterward, the data processing system extracts topic-related content associated with the detected set of topics of interest to the parties from captured meeting data corresponding to the set of meetings, such as meeting recordings 308 in FIG. 3 (step 506). The data processing system extracts the topic-related content associated with the detected set of topics of interest to the parties from the captured meeting data corresponding to the set of meetings by performing at least one of video analysis, textual analysis, automated scene detection, and natural language processing of the captured meeting data. For example, the data processing system may use textual analysis 320 and visual analysis 322 in FIG. 3 to extract the topic-related content.

Subsequently, the data processing system generates a meeting digest of the set of meetings using the topic-related content associated with the detected set of topics of interest to the parties extracted from the captured meeting data corresponding to the set of meetings (step 508). In addition, the data processing system generates an email that includes the generated meeting digest of the set of meetings, such as email with meeting digest included 336 in FIG. 3 (step 510). Then, the data processing system sends the email that includes the generated meeting digest of the set of meetings to the user associated with the generated user model via a network, such as network 102 in FIG. 1 (step 512). Further, the data processing system modifies the generated meeting digest of the set of meetings based on user input (step 514). Moreover, the data processing system modifies the generated user model associated with the user based on user feedback (step 516). The user feedback may include, for example, selections of content by the user within the email that includes the generated meeting digest of the set of meetings. The process terminates thereafter.

With reference now to FIG. 6, a flowchart illustrating a process for generating a user model is shown in accordance with an illustrative embodiment. The process shown in FIG. 6 may be implemented in a data processing system, such as, for example, data processing system 200 in FIG. 2. Also, the process shown in FIG. 6 may be implemented in step 502 in FIG. 5.

The process begins when the data processing system collects data regarding a user from a plurality of sources via a network, such as network 102 in FIG. 1 (step 602). In addition, the data processing system generates a statistical model based on the collected data regarding the user (step 604). Then, the data processing system determines preferences and interests of the user based on the statistical model (step 606).

Afterward, the data processing system generates a user model associated with the user that includes the preferences and interests of the user, such as one of user models 328 that includes user preferences and interests 332 in FIG. 3 (step 608). Subsequently, the data processing system edits a set of meeting summaries corresponding to a set of meetings based on the preferences and interests of the user included in the generated user model to personalize the set of meeting summaries to the user (step 610). Then, the data processing system generates a meeting digest of the set of meetings to include the personalized set of meeting summaries corresponding to the set of meetings, such as meeting digest with a personalized set of meeting summaries 338 in FIG. 3 (step 612). The personalized set of meeting summaries includes hyperlinks to meeting data associated with the personalized set of meeting summaries. The hyperlinks may be, for example, highlighted hyperlinks 414 in FIG. 4.

In addition, the data processing system sends the generated meeting digest of the set of meetings including the personalized set of meeting summaries to the user associated with the generated user model via the network (step 614). The data processing system may send the generated digest of the personalized set of meeting summaries in, for example, an email, such as email with meeting digest included 336 in FIG. 3, or as an entry in a user calendar, such as user calendar 334 in FIG. 3. Also, the data processing system receives user feedback through selection of one or more of the hyperlinks to the meeting data located within the personalized set of meeting summaries in the generated digest (step 616). Furthermore, the data processing system updates the statistical model based on the received user feedback (step 618). Thereafter, the process returns to step 602 where the data processing system continues to collect data regarding the user.

Figure 7:
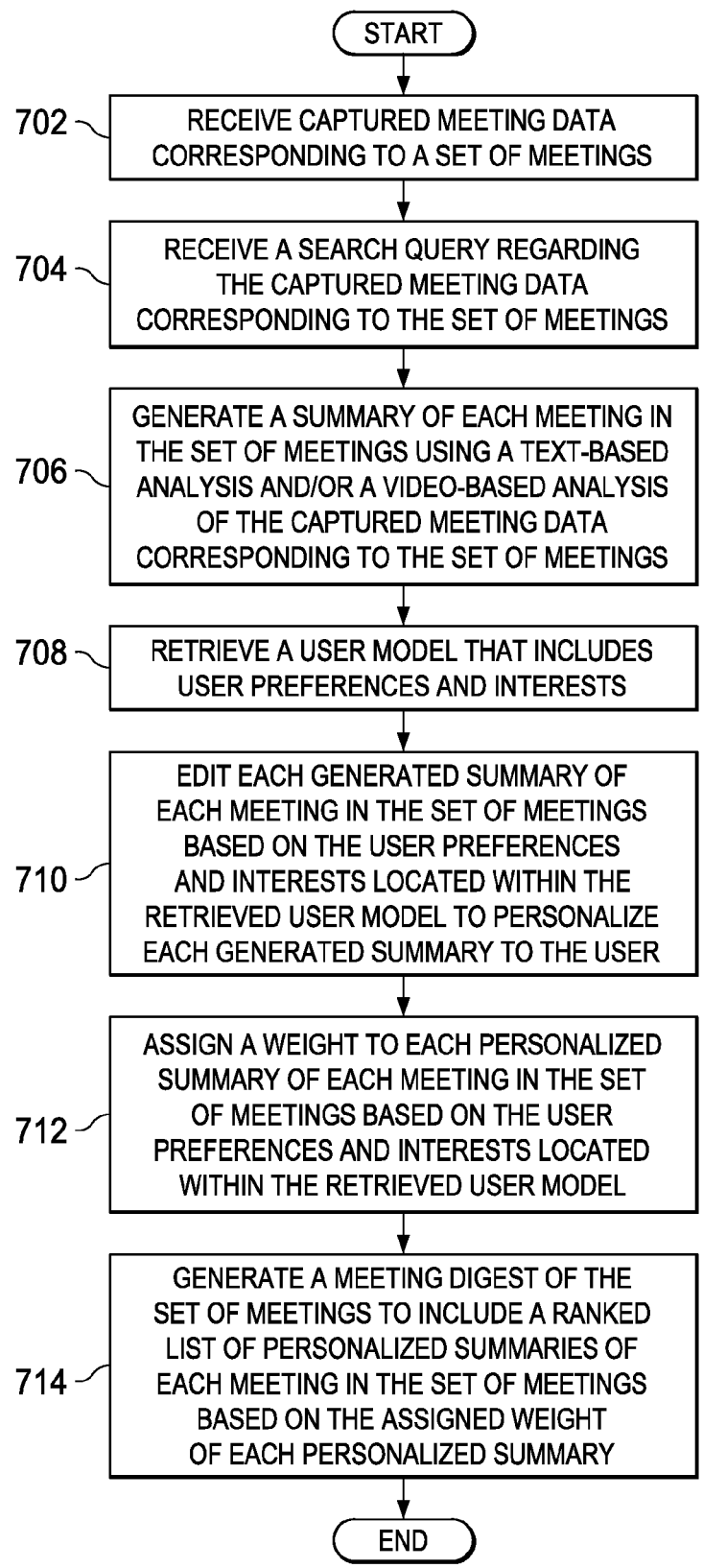
FIG. 7 is a flowchart illustrating a process for generating a meeting digest of a set of meetings in accordance with an illustrative embodiment.

With reference now to FIG. 7, a flowchart illustrating a process for generating a meeting digest of a set of meetings is shown in accordance with an illustrative embodiment. The process shown in FIG. 7 may be implemented in a data processing system, such as, for example, data processing system 200 in FIG. 2. Also, the process shown in FIG. 7 may be implemented in step 508 in FIG. 5.

The process begins when the data processing system receives captured meeting data corresponding to a set of meetings, such as meeting recordings 308 in FIG. 3 (step 702). The data processing system may receive the captured meeting data corresponding to the set of meetings in response to a request from the data processing system to a server device, such as conferencing server device 302 in FIG. 3, for the captured meeting data corresponding to the set of meetings. Alternatively, the data processing system may receive the captured meeting data corresponding to the set of meetings from the conferencing server device automatically on a predetermined time interval basis, such as daily, weekly, or monthly, or after the recording of each meeting is completed.

After receiving the captured meeting data corresponding to a set of meetings in step 702, the data processing system receives a search query regarding the captured meeting data corresponding to the set of meetings (step 704). The data processing system generates a summary of each meeting in the set of meetings using a text-based analysis and/or a video-based analysis of the captured meeting data corresponding to the set of meetings (step 706). For example, meeting digest server device 304 may generate meeting summary 312 using textual analysis 320 and visual analysis 322 in FIG. 3. In addition, the data processing system retrieves a user model that includes user preferences and interests from a database. For example, meeting digest server device 304 retrieves one of user models 328 that includes user preferences and interests 332 from database 324 in FIG. 3 (step 708).

Further, the data processing system edits each generated summary of each meeting in the set of meetings based on the user preferences and interests located within the retrieved user model to personalize each generated summary to the user (step 710). Then, the data processing system assigns a weight to each personalized summary of each meeting in the set of meetings based on the user preferences and interests located within the retrieved user model (step 712). For example, the data processing system may assign a personalized summary of meeting A with a lower weight than a personalized summary of meeting B, which has a higher weight than a personalized summary of meeting C, which has a lower weight than the personalized summary of meeting A. In other words, the weight of meeting A<the weight of meeting B>the weight of meeting C<the weight of meeting A. Subsequently, the data processing system generates a meeting digest of the set of meetings to include a ranked list of personalized summaries of each meeting in the set of meetings based on the assigned weight of each personalized summary (step 714). For example, using the illustration above, the meeting digest of the set of meetings would be the personalized summary of meeting B first, and then the personalized summary of meeting A, followed by the personalized summary of meeting C. It should be noted that the data processing system takes into consideration the social relationships of the user during the weighting and ranking of the personalized summaries. The process terminates thereafter.

Thus, illustrative embodiments of the present invention provide a computer implemented method, computer system, and computer program product for automatically generating a meeting digest of a set of one or more meetings that is personalized to a particular user based on a user model associated with the user. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for automatically generating a meeting digest of a set of meetings, the computer implemented method comprising:

detecting, by a computer, a set of topics of interest to parties to the set of meetings utilizing a user model associated with a user that is based on at least one of communications, relationships, and roles of the parties to the set of meetings;

receiving, by the computer, recorded meeting data corresponding to the set of meetings from a conferencing server that recorded contents of the set of meetings;

extracting, by the computer, topic-related content associated with the set of topics of interest to the parties from the recorded meeting data corresponding to the set of meetings received from the conferencing server; and generating, by the computer, the meeting digest of the set of meetings using the topic-related content associated with the set of topics of interest to the parties extracted from the recorded meeting data corresponding to the set of meetings.

2. The computer implemented method of claim 1, further comprising:

generating, by the computer, an email that includes the meeting digest of the set of meetings; and sending, by the computer, the email that includes the meeting digest of the set of meetings via a network.

3. The computer implemented method of claim 2, further comprising:

modifying, by the computer, the user model associated with the user based on receiving user feedback through selection of one or more highlighted hyperlinks within the email that includes the meeting digest of the set of meetings, wherein the highlighted hyperlinks are active links to corresponding content within the recorded meeting data received from the conferencing server.

4. The computer implemented method of claim 1, further comprising:

modifying, by the computer, the meeting digest of the set of meetings based on user input.

5. The computer implemented method of claim 1, further comprising:

mining, by the computer, data regarding the user from a plurality of data sources that includes an electronic calendar corresponding to the user on a personal computer, a browser history corresponding to the user on the personal computer, an electronic address book corresponding to the user on the personal computer, email communications corresponding to the user on the personal computer, instant messaging communications corresponding to the user on the personal computer, chat room discussions corresponding to the user on the personal computer, internet protocol telephony discussions corresponding to the user on the personal computer, documents created by the user on the personal computer, documents viewed by the user on the personal computer, video clips viewed by the user on the personal computer, and meeting programs on the personal computer providing information regarding at least one of participation of the user in meetings or a role of the user in meetings;

generating, by the computer, a statistical model based on the data mined from the plurality of sources regarding the user;

determining, by the computer, preferences and interests of the user based on the statistical model generated from the data mined from the plurality of sources regarding the user; and generating, by the computer, the user model associated with the user to include the preferences and interests of the user.

6. The computer implemented method of claim 5, further comprising:

editing, by the computer, a set of meeting summaries corresponding to the set of meetings based on the preferences and interests of the user located within the user model to personalize the set of meeting summaries to the user, wherein the set of meeting summaries includes a set of thumbnail frames as a visual summary of recorded videos of the set of meetings, a set of keyword summaries of textual content extracted from transcripts and presentation slides of the set of meetings, a set of extracted meeting artifacts of the set of meetings that includes action items, dates, names, and uniform resource locators, and a set of highlighted hyperlinks that are active links to corresponding content within the recorded meeting data corresponding to the set of meetings; and generating, by the computer, the meeting digest of the set of meetings to include the personalized set of meeting summaries corresponding to the set of meetings.

7. The computer implemented method of claim 1, further comprising:

receiving, by the computer, a search query regarding the recorded meeting data corresponding to the set of meetings; and generating, by the computer, a summary of each meeting in the set of meetings recorded by the conferencing server using at least one of a text-based analysis and a video-based analysis of the recorded meeting data corresponding to the set of meetings received from the conferencing server.

8. The computer implemented method of claim 7, further comprising:

editing, by the computer, the summary of each meeting in the set of meetings recorded by the conferencing server based on user preferences and interests located within the user model to personalize the summary to the user;

assigning, by the computer, a weight to the personalized summary of each meeting in the set of meetings based on the user preferences and interests located within the user model; and generating, by the computer, the meeting digest of the set of meetings to include a ranked list of personalized summaries of each meeting in the set of meetings based on the assigned weight of each personalized summary.

9. The computer implemented method of claim 1, wherein the meeting digest of the set of meetings includes at least one of keywords, selected video frames, snippets from email communications, snippets from instant messaging communications, snippets from chat room discussions, extracted audio content, speech to text extracted phrases, and extracted "to do" items associated with the recorded meeting data corresponding to the set of meetings.

10. The computer implemented method of claim 1, wherein the computer extracts the topic-related content from the set of topics of interest to the parties by performing at least one of video analysis, text analysis, automated scene detection, and natural language processing of the recorded meeting data corresponding to the set of meetings received from the conferencing server.

11. The computer implemented method of claim 10, wherein the automated scene detection includes detecting frames within a video recording of a meeting having a correlation with other frames, clustering the frames into different clusters of frames based on frame correlation, ranking the different clusters of frames based on relevance to a topic of the meeting, selecting a set of frames based on the ranking of the different clusters of frames, and generating a static visual summary of a set of thumbnail images of the video recording of the meeting based on the selected set of frames, and wherein the natural language processing of the meeting data corresponding to the set of meetings includes at least one of topic detection and named entity detection within the meeting data.

12. A computer system for automatically generating a meeting digest of a set of meetings, the computer system comprising:

a bus system;

a storage device connected to bus system, wherein the storage device stores computer readable program code; and a processor connected to the bus system, wherein the processor executes the computer readable program code to detect a set of topics of interest to parties to the set of meetings utilizing a user model associated with a user that is based on at least one of communications, relationships, and roles of the parties to the set of meetings; receive recorded meeting data corresponding to the set of meetings from a conferencing server that recorded contents of the set of meetings; extract topic-related content associated with the set of topics of interest to the parties from the recorded meeting data corresponding to the set of meetings received from the conferencing server; and generate the meeting digest of the set of meetings using the topic-related content associated with the set of topics of interest to the parties extracted from the recorded meeting data corresponding to the set of meetings.

13. The computer system of claim 12, wherein the processor further executes the computer readable program code to generate an email that includes the meeting digest of the set of meetings; and send the email that includes the meeting digest of the set of meetings via a network.

14. A computer program product stored on a non-transitory computer readable medium having computer readable program code embodied thereon that is executable by a computer for automatically generating a meeting digest of a set of meetings, the computer program product comprising:

computer readable program code for detecting a set of topics of interest to parties to the set of meetings utilizing a user model associated with a user that is based on at least one of communications, relationships, and roles of the parties to the set of meetings;

computer readable program code for receiving recorded meeting data corresponding to the set of meetings from a conferencing server that recorded contents of the set of meetings;

computer readable program code for extracting topic-related content associated with the set of topics of interest to the parties from the recorded meeting data corresponding to the set of meetings received from the conferencing server; and computer readable program code for generating the meeting digest of the set of meetings using the topic-related content associated with the set of topics of interest to the parties extracted from the recorded meeting data corresponding to the set of meetings.

15. The computer program product of claim 14, further comprising:

computer readable program code for generating an email that includes the meeting digest of the set of meetings; and computer readable program code for sending the email that includes the meeting digest of the set of meetings via a network.

16. The computer program product of claim 15, further comprising:

computer readable program code for modifying the user model associated with the user based on receiving user feedback through selection of one or more highlighted hyperlinks within the email that includes the meeting digest of the set of meetings, wherein the highlighted hyperlinks are active links to corresponding content within the recorded meeting data received from the conferencing server.

17. The computer program product of claim 14, further comprising:

computer readable program code for modifying the meeting digest of the set of meetings based on user input.

18. The computer program product of claim 14, further comprising:

computer readable program code for mining data regarding the user from a plurality of data sources that includes an electronic calendar corresponding to the user on a personal computer, a browser history corresponding to the user on the personal computer, an electronic address book corresponding to the user on the personal computer, email communications corresponding to the user on the personal computer, instant messaging communications corresponding to the user on the personal computer, chat room discussions corresponding to the user on the personal computer, internet protocol telephony discussions corresponding to the user on the personal computer, documents created by the user on the personal computer, documents viewed by the user on the personal computer, video clips viewed by the user on the personal computer, and meeting programs on the personal computer providing information regarding at least one of participation of the user in meetings or a role of the user in meetings;

computer readable program code for generating a statistical model based on collected the data mined from the plurality of sources regarding the user;

computer readable program code for determining preferences and interests of the user based on the statistical model generated from the data mined from the plurality of sources regarding the user; and computer readable program code for generating the user model associated with the user to include the preferences and interests of the user.

19. The computer program product of claim 18, further comprising:

computer readable program code for editing a set of meeting summaries corresponding to the set of meetings based on the preferences and interests of the user located within the user model to personalize the set of meeting summaries to the user, wherein the set of meeting summaries includes a set of thumbnail frames as a visual summary of recorded videos of the set of meetings, a set of keyword summaries of textual content extracted from transcripts and presentation slides of the set of meetings, a set of extracted meeting artifacts of the set of meetings that includes action items, dates, names, and uniform resource locators, and a set of highlighted hyperlinks that are active links to corresponding content within the recorded meeting data corresponding to the set of meetings; and computer readable program code for generating the meeting digest of the set of meetings to include the personalized set of meeting summaries corresponding to the set of meetings.

20. The computer program product of claim 14, further comprising:

computer readable program code for receiving a search query regarding the recorded meeting data corresponding to the set of meetings; and computer readable program code for generating a summary of each meeting in the set of meetings recorded by the conferencing server using at least one of a text-based analysis and a video-based analysis of the recorded meeting data corresponding to the set of meetings received from the conferencing server.

* * * * *